United States Patent

Nicaud et al.

[11] Patent Number: 6,043,289
[45] Date of Patent: Mar. 28, 2000

[54] CATALYZED DEGRADATION OF THERMOPLASTIC POLYOLEFINS AND INCORPORATION OF THE DEGRADATION PRODUCTS INTO HEAVY HYDROCARBONS

[75] Inventors: Jacques Nicaud, Gargenville; Guy Lemoine, Le Havre; Jacques Jarrin, Nanterre, all of France

[73] Assignee: Institut Francais du Petrole, Rueil-Malmaison, France

[21] Appl. No.: 09/063,829

[22] Filed: Apr. 22, 1998

[30] Foreign Application Priority Data

Apr. 22, 1997 [FR] France ................................. 97 05050

[51] Int. Cl.[7] .............................. C08J 11/10; C08L 95/100

[52] U.S. Cl. .............................. 521/47; 521/40.5; 524/62; 528/485; 528/490; 523/351

[58] Field of Search ................................ 521/40, 40.5, 47; 525/54.5, 333.7, 370, 371; 585/241; 524/62; 523/351; 528/485, 490

[56] References Cited

FOREIGN PATENT DOCUMENTS

| 0 414 439 | 2/1991 | European Pat. Off. . |
| 1425695 | 7/1966 | France . |
| 44 24 290 | 1/1996 | Germany . |
| 195 00 425 | 11/1996 | Germany . |

*Primary Examiner*—Tae Yoon
*Assistant Examiner*—Katarzyna Wyrozebski
*Attorney, Agent, or Firm*—Millen, White, Zelano & Branigan, P.C.

[57] ABSTRACT

A process for degrading thermoplastic polyolefins, in particular high or medium density polyethylenes, uses as a catalyst a mineral solid containing copper or a mineral solid containing aluminium and silicon and with an acid nature, at a temperature of 200° C. to 450° C., degradation being accompanied by incorporation of the degradation products into a heavy hydrocarbon such as a bitumen base.

Incorporating degraded thermoplastic polyolefins, in particular degraded high or medium density polyethylenes, into heavy hydrocarbons can produce compositions with industrial and road applications.

20 Claims, 1 Drawing Sheet

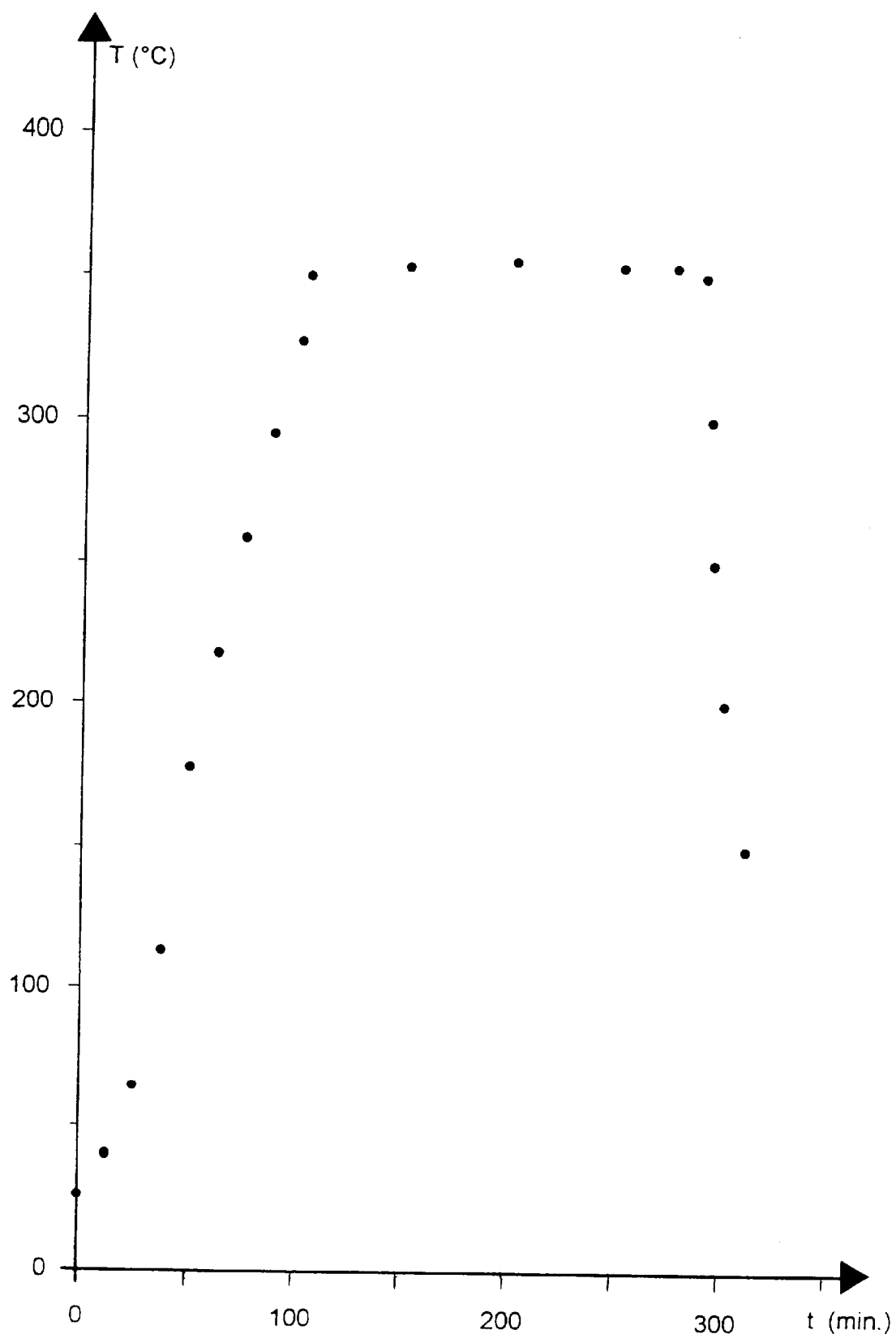

CATALYZED DEGRADATION OF THERMOPLASTIC POLYOLEFINS AND INCORPORATION OF THE DEGRADATION PRODUCTS INTO HEAVY HYDROCARBONS

The invention relates to a process for degrading thermoplastic polyolefins, in particular high or medium density polyethylenes, and incorporating the degraded thermoplastic polyolefins into heavy hydrocarbons.

It also relates to upgrading thermoplastic polyolefin waste by incorporating their degradation products into heavy hydrocarbons such as bitumen bases.

Plastic packaging constituted by polyolefins must be recycled for environmental protection reasons. This is particularly the case for high density polyethylene films and containers used for packaging lubricating oils, household detergents, phytosanitary products, etc.; such products constitute well identified sources of high density polyethylene for recycling.

Incorporating polyolefin waste into various heavy hydrocarbons such as bitumen bases to produce modified bitumen compositions with properties which may be improved has been considered, particularly for industrial and road applications.

However, the thermal and/or mechanical degradation methods which have been described are principally applicable to low density polyethylenes and cannot incorporate large quantities of all types of thermoplastic polyolefins, in particular all types of high or medium density polyethylenes, into heavy hydrocarbons, particularly when such polyethylenes are mixtures, as is often the case for polyethylenes recovered for recycling.

We have now, unexpectedly, discovered that certain solid mineral compounds could be advantageously used to degrade thermoplastic polyolefins, in particular when they are as a mixture. These compounds can increase the degradation rate of all types of polyolefins and thus can reduce the time required to degrade the polyolefin(s).

The invention thus proposes a process for degrading thermoplastic polyolefins which comprises mixing, at high temperature, at least one thermoplastic polyolefin with at least one catalyst consisting essentially of a solid mineral compound containing copper or a solid mineral compound containing aluminium and silicon and having an acid nature, in the presence of at least one heavy hydrocarbon.

The degraded thermoplastic polyolefins are thus upgraded in accordance with the invention by incorporating them into a heavy hydrocarbon (or a mixture of heavy hydrocarbons) such as a bitumen base.

The degraded thermoplastic polyolefins of the invention can also be upgraded into a variety of other hydrocarbon compositions such as polyethylene waxes or paraffinic hydrocarbons such as paraffin waxes.

The thermoplastic polyolefins to which the degradation process of the invention applies are generally homopolymers and copolymers of α-olefins containing 2 to 8 carbon atoms, more particularly high or medium density polyethylenes, polypropylenes or ethylene-propylene copolymers, these thermoplastic polyolefins generally being more than 35% crystalline. As an indication, high density polyethylenes (partially crystalline) melt in the region of about 135° C. and polypropylenes (partially crystalline) melt in the region of about 165° C.

Particular examples of high density polyethylenes are polyethylenes with high mass average molecular weights, for example about 150,000 to 200,000, and very high molecular weight polyethylenes, for example up to about 500,000 to 1,000,000.

The polyolefins considered in the invention can also consist of copolymers of ethylene or propylene with 1-butene, 1-hexene or 1-octene.

Mixtures of two or more thermoplastic polyolefins can also be considered.

The heavy hydrocarbons which can be used in the invention to obtain bitumen compositions can be mixtures of heavy hydrocarbons hereinafter termed "conventionally obtained bitumens", to differentiate them from "synthetic bitumens" described below. These conventionally obtained bitumens originate from crude oil, bituminous schists, heavy oils, bituminous sand, etc., or from coal.

These heavy hydrocarbons are, for example, characterized by a softening temperature, measured using the standard NF-T-66 008 method (ball-ring temperature) of at least 10° C., and/or a kinematic viscosity, measured at 100° C., of about 50 to about 700 $mm^2/s$.

The heavy hydrocarbons considered in the invention can, for example, consist of:

a) the heaviest fraction obtained by direct distillation of crude oil at atmospheric pressure or under reduced pressure;

b) the heavy phase obtained by solvent deasphalting a heavy fraction obtained using the processes described in a);

c) the oxidation product, in the presence or otherwise of catalysts, of a heavy fraction from a) or a heavy phase from b);

d) the oxidation product, in the presence or otherwise of catalysts, of a mixture: of a heavy fraction from a) or a heavy fraction from b) and
a distillate, or
an aromatic extract obtained from dearomatisation of lubricating oils, or
a deasphalting pitch; or e) a mixture of an oxidised product obtained from b) or c), and
a distillate, or
an aromatic extract obtained from dearomatisation of lubricating oils, or
a deasphalting pitch, or
a heavy fraction from a) or a heavy phase from b).

The mixture of heavy hydrocarbons which can be used can also be a synthetic bitumen with characteristics which are close to those of a conventionally obtained bitumen as described above: it could thus, for example, be a clear synthetic binder which can be coloured by adding pigments.

The heavy hydrocarbon mixtures can also consist, for example, of petroleum resins or indene-coumarone resins, for example mixed with aromatic and/or paraffinic hydrocarbons.

The petroleum resins can be prepared by polymerisation of unsaturated hydrocarbons present in unsaturated petroleum fractions such as the fractions obtained by thermal cracking or steam cracking or by pyrolysis.

Indene-coumarone resins are obtained from coal tar.

The thermoplastic polyolefin degradation process of the invention can more particularly be defined as comprising mixing, for example by mixing at a temperature of 200° C. to 450° C., preferably 250° C. to 375° C., of at least one thermoplastic polyolefin in the presence of a proportion, for example 0.1% to 6% by weight with respect to the weight of the thermoplastic polyolefin, of at least one catalyst selected from mineral solids containing copper or those containing aluminium and silicon and having an acid nature, in the presence of at least one heavy hydrocarbon.

Examples of solid mineral compounds containing copper or those containing aluminium and silicon and with an acid nature which can be used as catalysts in the degradation process of the invention are clays activated by an acidic treatment, acid silica-aluminas or acid zeolites, or cuprous oxide $Cu_2O$. Cuprous oxide is preferred and can in particular be used in a proportion of 0.1% to 2% by weight.

Degrading the thermoplastic polyolefin and incorporating it into the heavy hydrocarbon mixture is carried out by mixing, in the presence of a catalyst as defined above, a proportion of 5% to 99% by weight of a mixture of heavy hydrocarbons with a proportion of 1% to 95% by weight (including catalyst) of thermoplastic polyolefin.

Thus the degraded thermoplastic polyolefin(s) can be incorporated into the heavy hydrocarbons under consideration in proportions which are suitable for the intended applications for the bitumen compositions, i.e., generally about 1% to 25% by weight of degraded thermoplastic polyolefin (this proportion including the catalyst) with 75% to 99% by weight of heavy hydrocarbon mixture for industrial applications (for example the production of roofing) or road applications (pavement coatings). More particularly, a proportion of about 1% to 15% by weight of degraded thermoplastic polyolefin for road applications and about 3% to 25% by weight for industrial applications is incorporated into the heavy hydrocarbons.

More particularly, the simultaneous degradation and incorporation process of the invention means that "bitumen-polymer" compositions can be directly obtained in all proportions, for example in proportions suitable for industrial and road applications, these proportions being, as indicated above, about 1% to 15% by weight for road applications and about 3% to 25% by weight for industrial applications.

It may be advantageous to prepare "bitumen-polymer" mixtures which are concentrated in degraded polyolefins, known as "master mixtures", containing, for example, a proportion of 40% to 60% by weight of bitumen and a proportion of 60% to 40% by weight of degraded polyolefin.

These master mixtures can easily be stored. They can subsequently be diluted in bitumen for use to adjust the concentration of degraded polyolefin to a value which is suitable for the envisaged application.

When the cold behaviour of bituminous compositions prepared using the invention is to be improved, elastomers can be incorporated into them in the usual proportions, for example SBS (styrene-butadiene-styrene) rubbers or atactic polypropylenes.

The mixing operations carried out in the process of the invention can be effected using different types of reactors and mixers when carried out batchwise; they can also be carried out continuously, for example in a single or twin-screw extruder.

Depending on its final use, the bitumen compositions obtained using the process of the invention can, for example, have a penetrability of 20 to 330 at 25° C., measured for 1/10 mm,; they may have a dynamic viscosity of 18 to 440 Pa.s., measured at 60° C., and a kinematic viscosity of 100 to 530 mm$^2$/s.

The bitumen compositions obtained can also have a penetrability of 70 to 360 at 15° C., for 1/10 mm, and in this case a dynamic viscosity of 4.5 to 18 Pa.s., measured at 60° C., and a kinematic viscosity, measured at 135° C., of 50 to 100 mm$^2$/s.

The following examples illustrate the invention.

EXAMPLES 1 TO 6

Bitumen, which had been heated to 80° C. to allow it to flow, was charged into an electrically heated reactor provided with an anchor stirrer and inert gas circulation.

In the examples, a bitumen base of petroleum origin with the following characteristics was used:

kinematic viscosity at 100° C.: 615 mm$^2$/s;
penetrability at 25° C. for 1/10 mm: 500; (using NF-T-66 004)
softening point: (ball-ring temperature 24.5° C. using NF-T-66 008)

In Table 1, this bitumen is shown as Base B.

In each of Examples 1 to 4, a proportion of 11.5% by weight with respect to the total weight (bitumen+polyethylene) of a high density polyethylene recovered from used oil containers round to a coarse powder with a smallest dimension of the order of a few millimeters was introduced into the bitumen. This polyethylene is termed "recycled" in Table 1.

The containers were constituted by high density polyethylene with the following characteristics: a density of 0.949, a melt flow index of 0.5 g/10 min, measured at 190° C. at a load of 2.16 kg using ASTM standard D 1238, and molar masses, measured using gel permeation chromatography, of 150000 for the mass average and 20000 for the number average. The crystallinity, measured using differential scanning calorimetry (DSC), was of the order of 50%. Before transformation into containers, it had been sold by BASF under the trade name "Lupolen 5021D®".

In Examples 5 and 6, the same polyethylene as provided in granular form by the manufacturer was used, i.e., before transformation into containers ("virgin" in Table 1).

The catalyst used in Example 3 was a montmorillonite based clay (hydrated aluminium silicate with a $SiO_2/Al_2O_3$ ratio of 4/1) treated with a mineral acid. It is sold by Süd Chemie under the trade name "Tonsil Optimum FF®". It is hereinafter termed "Tonsil®". This catalyst was used in a proportion of 0.5% by weight with respect to the bitumen+polyethylene ensemble (i.e., about 4.4% with respect to the polyethylene). The catalyst used in Examples 4 and 6 was cuprous oxide ($Cu_2O$). It was used in a proportion of 0.1% by weight with respect to the bitumen+polyethylene ensemble (i.e., about 0.87% with respect to the polyethylene). A catalyst was not used in Examples 1, 2 and 5.

In each case, the mixture was heated to 350° C. with stirring (rotation rate: 350 revolutions per minute), the temperature rise period being about 2 hours and the time during which the temperature was held being, depending on the case, 1 hour or 3 hours, as indicated in Table 1. FIG. 1 shows the type of temperature profile obtained when the temperature is held at 350° C. for 3 hours.

After the temperature maintenance phase, the mixture was cooled in the reactor to a temperature of the order of 200° C., then cast through a bottom flap into plates a few millimeters thick, and the appearance was evaluated.

The result of the observations is shown in Table 1. Examples 1, 2 and 5 in Table 1 show that in the absence of catalyst, simple heat treatment of the bitumen-polyethylene mixture at 350° C. for 1 hour did not produce a satisfactory dispersion of the "virgin" or "recycled" polyethylene (even after 3 hours in the latter case) in the bitumen. The appearance of the cast plates was very irregular with heterogeneities which were visible to the naked eye, which meant that the dispersion was poor. In contrast, cast plates of all of the mixtures formed in the presence of the catalysts of the invention (Examples 3, 4 and 6) had a smooth appearance which meant that dispersion of the polyethylene in the bitumen was very good. The heterogeneous structure of the latter mixtures could not be seen with the naked eye and required the use of an optical microscope with an epifluorescent lamp to reveal the heterogeneous structure on a microscopic scale.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope therof, can make various changes and modifications of the invention to adapt it to various usages and conditions.

TABLE 1

| Example | | 1 | 2 | 3 | 4 | 5 | 6 |
|---|---|---|---|---|---|---|---|
| Simultaneous degradation and incorporation | Polyethylene | "recycled" | "recycled" | "recycled" | "recycled" | "virgin" | "virgin" |
| | wt % | 11.5 | 11.5 | 11.5 | 11.5 | 11.5 | 11.5 |
| | Bitumen | Base B | Base B | Base B | Base B | Base B | Base B |
| | wt % | 88.5 | 88.5 | 88.5 | 88.5 | 88.5 | 88.5 |
| | Catalyst | — | — | Tonsil ® | $Cu_2O$ | — | $Cu_2O$ |
| | wt % | — | — | 0.5 | 0.1 | — | 0.1 |
| | Temperature (° C.) | 350 | 350 | 350 | 350 | 350 | 350 |
| | Time (hours) | 1 | 3 | 1 | 1 | 1 | 1 |
| | Plate appearance 190° C. | heterogeneous | heterogeneous | homogeneous | homogeneous | heterogeneous | homogeneous |

The entire disclosure of all applications, patents and publications, cited above and below, and of corresponding French application No. 97/05.050, are hereby incorporated by reference.

What is claimed is:

1. A process for degrading a thermoplastic polyolefin and incorporating it into a mixture of heavy hydrocarbons, comprising mixing, at a temperature of 200° C. to 450° C., at least one thermoplastic polyolefin in the presence of at least one catalyst selected from the group consisting of mineral solids containing copper and mineral solids containing aluminum and silicon and having an acid nature, with at least one heavy hydrocarbon mixture under conditions sufficient to obtain a dispersion of said thermoplastic polyolefin in said hydrocarbon mixture, said dispersion appearing homogeneous to the naked eye, but appearing heterogeneous through an optical microscope with an epifluorescent lamp.

2. A process according to claim 1, characterized in that the proportion of thermoplastic polyolefin used is 1% to 95% by weight, catalysts included, with a proportion of 99% to 5% by weight of a mixture of heavy hydrocarbons.

3. A process according to claim 1, characterized in that said thermoplastic polyolefin is a homopolymer or copolymer of at least one α-olefin containing 2 to 8 carbon atoms.

4. A process according to claim 2, characterized in that said thermoplastic polyolefin is a high or medium density polyethylene.

5. A process according to claim 1, characterized in that said mixture of heavy hydrocarbons has a softening temperature, measured by the standard NF-T-66 008 method (ball-ring temperature) of at least 10° C. and/or a kinematic viscosity, measured at 100° C., of about 50 to 700 $mm^2/s$.

6. A process according to claim 1, characterized in that the catalyst is in a proportion of 0.1% to 6% by weight with respect to the weight of the thermoplastic polyolefin.

7. A process according to claim 1, characterized in that the catalyst is a at least one clay activated by at least one acid treatment, b an acid silica-alumina or c an acid zeolite.

8. A process according to claim 1, characterized in that the catalyst is cuprous oxide.

9. A process according to claim 8, characterized in that the proportion of cuprous oxide is 0.1% to 2% by weight with respect to the weight of the thermoplastic polyolefin.

10. A process according to claim 1, characterized in that the temperature is 250° C. to 375° C.

11. A process according to claim 1, characterized in that said mixture of heavy hydrocarbons consists essentially of bitumen.

12. A process according to claim 11, characterized in that for road applications, the thermoplastic polyolefin is incorporated into the bitumen in a proportion of 1% to 15% by weight.

13. A process according to claim 11, characterized in that for industrial applications, the thermoplastic polyolefin is incorporated into the bitumen in a proportion of 3% to 25% by weight.

14. A process according to claim 11, characterized in that the proportion of thermoplastic polyolefin provides a master mixture containing 40% to 60% by weight of degraded thermoplastic polyolefin with 60% to 40% by weight of bitumen.

15. A process according to claim 14, further comprising diluting the master mixture in bitumen to adjust the concentration of degraded thermoplastic polyolefin (catalyst included) to a value of from 1% to 25%.

16. A process according to claim 1, wherein the thermoplastic polyolefin comprises recycled polyethylene oil containers.

17. A process according to claim 15, wherein the concentration of degraded thermoplastic polyolefin is adjusted to a value of from 1% to 15%.

18. A process according to claim 15, wherein the concentration of degraded thermoplastic polyolefin is adjusted to a value of from 3% to 25%.

19. A process according to claim 1, wherein the mixture of heavy hydrocarbons comprises bitumen.

20. A process according to claim 19, wherein the mixture of heavy hydrocarbons further comprises an elastomer.

* * * * *